April 28, 1953 F. A. HESTER 2,636,938

FACSIMILE RECORDER WITH AUTOMATIC START-STOP

Filed Oct. 22, 1949

INVENTOR.
FRANK A. HESTER
BY Carl V. Olson
ATTORNEY

Patented Apr. 28, 1953 2,636,938

UNITED STATES PATENT OFFICE 2,636,938

FACSIMILE RECORDER WITH AUTOMATIC START-STOP

Frank A. Hester, New York, N. Y., assignor to Faximile, Inc., New York, N. Y., a corporation of Delaware Application October 22, 1949, Serial No. 122,963

3 Claims. (Cl. 178—6.6)

This invention relates to facsimile systems and more particularly to facsimile recorders having automatic means for starting and stopping responsively to a standard facsimile signal.

A most successful facsimile system for the transmission of graphic material by radio or wire includes a recorder wherein a strip of electrolytic paper is continuously passed between linear and helical electrodes having a point of intersection which moves in one direction across the paper to trace succeeding lines thereon. The fluctuating current flowing through the paper point-by-point and line-by-line reproduces the graphic material scanned at sending end of the system. In radio facsimile it is standard to transmit an interpage signal after each page of graphic material. The interpage signal appears at the receiver as a black bar across the recording paper and may include a limited amount of station identification printing or other indicia in reverse. The interpage signal provides a number of consecutive lines of full-black signal for phasing purposes at the recorder, i. e., to insure that the recorded material will be centered on the recording sheet.

In the operation of facsimile systems of the type under discussion, there are many occasions when it is desirable to have a facsimile receiver alert to facsimile signals that may be received, but not in full operation unless signals are actually being received. The strictly recording portion of the receiver should not operate in the absence of a facsimile signal for reasons of recording paper and electric current economy. It is therefore the general object of this invention to provide means responsive to standard facsimile signals for starting the recorder portion of a facsimile receiver upon receipt of a facsimile signal and for stopping the recorder after the discontinuance of a facsimile signal.

It is another object to provide recorder starting and stopping means which is operative automatically without the need for human attention.

It is a further object to provide a facsimile start-stop apparatus which is more reliable in operation than those previously known.

It is a further object to provide means for automatically stopping a facsimile recorder a predetermined time after the discontinuance of the facsimile signals to insure that the last received page of graphic material will be properly displayed for observation.

Pursuant to these and other objects which will be apparent to those skilled in the art, a portion of the received facsimile signal is applied to the control electrode of a thyratron or other equivalent electrical device having an A.-C. plate voltage supply to insure quenching of the tube in the absence of solid black signal. A resettable time switch in the recorder power circuit is reset responsively to firing of the thyratron on receipt of solid black signal. Unless another solid black signal (normally an interpage signal) is received within the predetermined delay of the time switch, the recorder power is interrupted. The expression "solid black facsimile signal," as used herein, means a signal operative to record a number of consecutive black lines, or if negative recordings are made, a number of consecutive white lines.

For a more detailed explanation of the invention reference is had to the following description taken in conjunction with the appended drawings wherein.

Figures 1, 2:
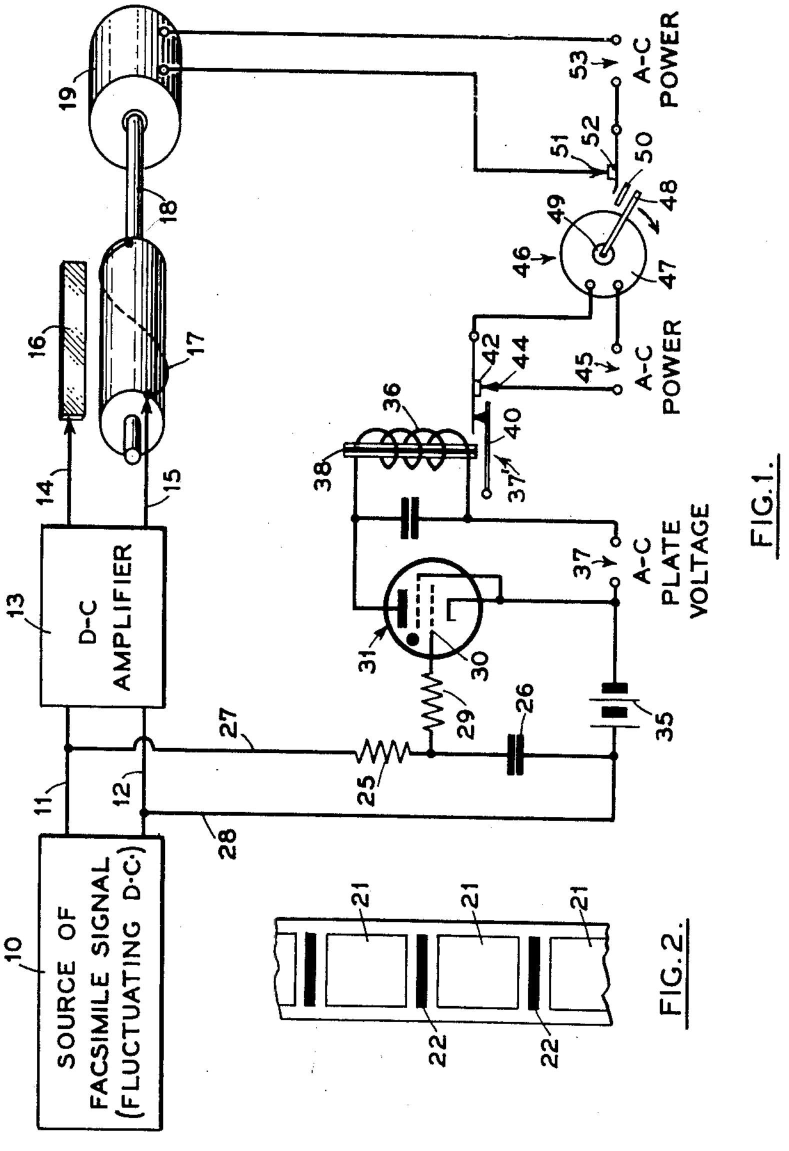
Fig. 1 is a schematic diagram of a presently preferred form of the invention.
Fig. 2 is a representation of recordings on a continuous strip of recording paper illustrating how pages of graphic material are separated by black bars corresponding to the interpage signals.

Referring now in greater detail to the drawings, the output of a source 10 of facsimile signals, which may be a facsimile radio receiver, is applied by wires 11 and 12 to a D.-C. amplifier 13. The output of the amplifier is applied by wires 14 and 15 to linear recording electrode 16 and helical recording electrode 17, respectively. Electro-responsive recording paper passes between the recording electrodes and is marked point-by-point and line-by-line to reproduce the graphic copy scanned at the sending end of the system. Helical electrode 17 is rotated by shaft 18 coupled to synchronous motor 19.

The recording paper (not shown) emerging from between linear and helical electrodes 16, 17 may, as represented in Fig. 2, consist of page portions 21 bearing graphic material, as type, pictures and drawings; the page portions being separated by black bars 22 resulting from the interpage signals received. The bars 22 may contain station identification in reverse printing. The control circuits of the present invention are responsive to the full-strength interpage signals.

A high-impedance R–C integrating network consisting of resistor 25 and capacitor 26 is connected by wires 27 and 28 to the output of signal source 10. The output of the integrating network is connected through resistor 29 to the control electrode 30 of a thyratron tube 31. Resistors 25 and 29 may be 5 megohms in value, and capacitor 26, 0.05 microfarad. Thyratron 31 has a bias voltage source 35 in its grid circuit and a relay magnet coil 36 and A.-C. plate voltage source 37 in its plate circuit. In operation, by reason of the integrating network in the input circuit of thyratron 31, the thyratron is rendered conductive only when a full-strength marking signal of appreciable duration is received, as for example, an interpage signal. Thyratron 31 is rendered non-conductive (quenched) upon the termination of the interpage signal by reason of its A.-C. plate voltage source 37 which makes the plate negative once during each cycle. It will be obvious to those skilled in the art that other types of discharge devices may be substituted for thyratron 31. It is intended that the term "thyratron" as used herein encompasses these equivalent devices.

A relay, generally designated 37', includes a core 38 (for coil 36) which acts on an armature 40, movable contact 42 responsive to the armature, and cooperating fixed contact 44. Cooperating contacts 42, 44 are normally closed.

The portion of the circuit thus far described may be common with a similar portion of the circuit shown in a copending application of John W. Smith, Serial No. 122,928, filed October 22, 1949, on an Automatic Phasing Circuit for Facsimile Recorders, when it is desired to incorporate both inventions in a single recorder.

Contacts 42, 44 are in series with an A.-C. power source 45 supplying a resettable time delay switch 46. Switch 46 may be of the conventional type including a motor geared to a spring-biased arm which opens a circuit a predetermined time after the motor is energized, the spring returning the arm to the initial position when the motor is deenergized. A magnetic clutch energized only when the motor is energized may be included to provide rapid resetting of the arm. In the drawings, the time delay switch 46 is represented as including a gear motor 47, and actuating arm 48 biased by coil spring 49, a reset stop 50 for the arm, a fixed contact 51, and a movable contact 52 acted upon by the arm. When switch 46 is energized, arm 48 moves slowly in the direction of the arrow until it opens contacts 51, 52. The arm remains in this extreme position as long as the switch is energized, and upon deenergization, the arm is returned by spring 49 to its initial position bearing against the under side of stop 50. Contacts 51, 52 are in series with the A.-C. power source 53 connected to motor 19. It will be understood that motor 19 may drive paper feed rolls (not shown) through appropriate gears, or the paper feed rolls may be driven by a separate motor in the same power circuit with motor 19.

In the operation of the circuit, thyratron 31 conducts when an interpage signal is received by the facsimile recorder. Current flowing through the thyratron actuates relay 37' opening contacts 42, 44 thereby allowing arm 48 of the resettable time delay switch 46 to return to its reset position against stop 50. This condition prevails until the interpage signal is no longer received whereupon contacts 42, 44 return to their normally-closed position energizing delay switch 46. If no interpage signal is received prior to the time the arm 48 opens contacts 51, 50, power source 53 is disconnected from motor 19 and remains so until an interpage signal is received. The switch 46 may have a time delay in the order of five minutes which period is longer than the three minutes required to record a page of graphic material with commercial equipment presently available. The recorder portion of the facsimile receiver is thus started immediately upon receipt of an interpage signal and continues to run until about five minutes after receipt of the last interpage signal. It may be noted that it is the practice to send an interpage signal prior to the first page of graphic material as well as at the end of each page.

It will be understood that the facsimile receiver cannot distinguish the interpage signal from the signal resulting from the scanning of graphic copy including a solid black portion extending across the page. The operation of the apparatus of this invention is not in any way adversely affected by these latter signals. The regularly-occurring interpage signals insure the functioning of the apparatus in the desired manner.

While the invention has been described in some detail by reference to specific circuits shown, it will be understood that this has been done by way of illustration, and that the scope of the invention is not to be limited thereto.

What is claimed is:

1. In a facsimile recorder, an automatic start-stop apparatus comprising: an integrating network receptive to a fluctuating D.-C. facsimile signal, a thyratron receptive to the output of the integrating network, an output circuit for the thyratron including an A.-C. plate voltage source and an electromagnet, a motor for driving the mechanical parts of the facsimile recorder and a source of power for the motor, a resettable time delay switch operative to interrupt the power to said motor after a predetermined time delay, and switch means responsive to said electromagnet in the thyratron plate circuit to reset the time delay switch, whereby the motor is started upon receipt of a solid black signal and is stopped a predetermined time after the last-received solid black signal.

2. In a facsimile recorder, an automatic start-stop apparatus comprising: an integrating network receptive to a fluctuating D.-C. facsimile signal, a thyratron having a control grid receptive to the output of the integrating network, an output circuit for the thyratron including an A.-C. plate voltage source and a relay, a motor for driving the mechanical parts of the facsimile recorder and a source of power for the motor, and a normally-energized electrically-driven resettable time delay switch operative to interrupt the power to said motor after a predetermined time delay, said relay being operative to deenergize and reset the time delay switch when the integrating network is receptive to a solid black signal.

3. In a facsimile recorder, an automatic start-stop apparatus for a driving motor comprising: an integrating network receptive to a fluctuating D.-C. facsimile signal, a thyratron having a control grid receptive to the output of the integrating network, an output circuit for the thyratron including an A.-C. plate voltage source and a relay, the thyratron being conductive and the relay being energized when the integrating network is receptive to a solid black signal, and a resettable time delay switch operative to interrupt the power to said driving motor at a predetermined time after being reset, the time delay switch being reset responsively to said relay.

FRANK A. HESTER.

References Cited in the file of this patent

UNITED STATES PATENTS

| Number | Name | Date |
|---|---|---|
| 1,648,974 | Vernam | Nov. 15, 1927 |
| 1,688,711 | Hewitt | Oct. 23, 1928 |
| 2,341,315 | Cooley | Feb. 8, 1944 |
| 2,495,131 | Poulter | Jan. 17, 1950 |
| 2,540,922 | Wickham | Feb. 6, 1951 |